(12) United States Patent
Chen (10) Patent No.: US 7,817,826 B2
(45) Date of Patent: Oct. 19, 2010

(54) APPARATUS AND METHOD FOR PARTIAL COMPONENT FACIAL RECOGNITION

(75) Inventor: Tianlong Chen, Gaithersburg, MD (US)

(73) Assignee: Intelitrac Inc., Chantilly, VA (US)

( * ) Notice: Subject to any disclaimer, the term of this patent is extended or adjusted under 35 U.S.C. 154(b) by 1042 days.

(21) Appl. No.: 11/464,145

(22) Filed: Aug. 11, 2006

(65) Prior Publication Data

US 2007/0036398 A1    Feb. 15, 2007

Related U.S. Application Data

(60) Provisional application No. 60/708,053, filed on Aug. 12, 2005.

(51) Int. Cl.
*G06K 9/00* (2006.01)
(52) U.S. Cl. .................. 382/118; 382/115; 382/116; 382/117
(58) Field of Classification Search ............... 382/100, 382/115, 117, 118
See application file for complete search history.

(56) References Cited

U.S. PATENT DOCUMENTS

| | | | | |
|---|---|---|---|---|
| 5,905,807 | A * | 5/1999 | Kado et al. | 382/118 |
| 7,203,346 | B2 * | 4/2007 | Kim et al. | 382/118 |
| 7,224,823 | B2 * | 5/2007 | Hayata et al. | 382/118 |
| 7,242,810 | B2 * | 7/2007 | Chang | 382/227 |
| 2002/0081019 | A1 | 6/2002 | Katayama et al. | |
| 2002/0106114 | A1 | 8/2002 | Yan et al. | |
| 2006/0280341 | A1 * | 12/2006 | Koshizen et al. | 382/118 |

OTHER PUBLICATIONS

Bernd Heisele, Purdy Ho, Tomaso Poggio, "Face Recognition with Support Vector Machines: Global versus Component-based Approach", Proceedings 8th International Conference on Computer Vision, vol. 2, pp. 1-7, Vancouver 2001.*

Kiminori Sato, Shishir Shah, and J. K. Aggarwal, "Partial Face Recognition using Radial Basis Function Networks" Third IEEE International Conference on Automatic Face and Gesture Recognition, Apr. 1998 pp. 288-293.*

Yuri Ivanov, Bernd Heisele and Thomas Serre, "Using Component Features for Face Recognition" Sixth IEEE International Conference on Automatic Face and Gesture Recognition, May 2004, pp. 421-426.*

J. Huang, V. Blanz and B. Heisele, "Face Recognition Using Component-Based SVM Classification and Morphable Models," SVM 2002, LNCS 2388, p. 334-341 (2002).

* cited by examiner

*Primary Examiner*—Matthew C Bella
*Assistant Examiner*—Eric Rush
(74) *Attorney, Agent, or Firm*—24IP Law Group; Timothy R. DeWitt (57) ABSTRACT

A method and system for identifying a human being or verifying two human beings by partial component(s) of their face. A probe human face image is identified from the gallery database by detecting and segmenting a plurality of partial face components from the probe human face image; creating a probe template for each of the partial face components from the probe human face image, comparing first and second probe templates against first and second categories of templates in the gallery database to generate similarity scores between the probe templates and templates in the gallery database; generating a plurality of sub-lists of candidate images having partial face component templates with the highest similarity scores over a first preset threshold; generating for each candidate image from each sub-list a combined similarity score; and generating a final list of candidates from said candidates of combined similarity scores over a second preset threshold.

3 Claims, 7 Drawing Sheets

APPARATUS AND METHOD FOR PARTIAL COMPONENT FACIAL RECOGNITION

CROSS-REFERENCE TO RELATED APPLICATIONS

The present application claims the benefit of the filing date of U.S. Provisional Application Ser. No. 60/708,053 entitled "Apparatus and Method for Partial Component Facial Recognition," and filed on Aug. 12, 2005

Other related applications include the following:

Invariant Memory Page Pool and Implementation Thereof, U.S. Pat. No. 6,912,641, issued on Jun. 28, 2005; Inventors: Tianlong Chen, Yingbin Wang and Yinong Wei.

Memory-Resident Database Management System and Implementation Thereof, Ser. No. 10/347,678; Filed on Jan. 22, 2003; Inventors: Tianlong Chen, Jonathan Vu.

Distributed Memory Computing Environment and Implementation Thereof; U.S. Pat. No. 7,043,623, issued on May 9, 2006, Inventors: Tianlong Chen, Jonathan Vu, Yingbin Wang.

Apparatus and Method for Biometric Database Management System; U.S. application Ser. No. 11/064,266 filed on Feb. 22, 2005; Inventors: Yingbin Wang and Tianlong Chen.

Image Indexing Search and Implementation Thereof; U.S. application Ser. No. 10/718,738 filed on Nov. 21, 2003; Inventors: Tianlong Chen, Yi Rui, Yingbin Wang, and Yinong Wei.

The entirety of each of the aforementioned patents and patent applications is incorporated by reference herein.

FIELD OF THE INVENTION

The present invention is related to face recognition systems and methods.

BACKGROUND OF THE INVENTION

Most of current face recognition will fail when portion of a human face is blocked or occluded by obstacle or strong light, in such cases, whole face recognition becomes impossible or very difficult. The invention presents a face recognition method to do partial face recognition to partially overcome the difficulty in recognizing human identity by occluded face.

SUMMARY OF THE INVENTION

The present invention disclosed and claimed herein is a method and system for identifying a human being or verifying two human beings by their partial component(s) of their face which may include one or multiple of left eye(s), right eye(s), nose(s), mouth(s), left ear(s), or right ear(s).

In still another aspect of the disclosed embodiment, a method for preparing a gallery database in which each components are grouped by its category in the present invention;

In still another aspect of the disclosed embodiment, a method for searching partial components for identification and verification in the present invention.

In a preferred embodiment, the present invention is a method and system for identifying a human being or verifying two human beings by partial component(s) of their face which may include one or multiple of left eye(s), right eye(s), nose(s), mouth(s), left ear(s), or right ear(s). A gallery database for face recognition is constructed from a plurality of human face images by detecting and segmenting a plurality of partial face components from each of the human face images, creating a template for each of the plurality of partial face components, and storing the templates in the gallery database. Templates from a plurality of partial face components from a same human face image are linked with one ID in the gallery database. A probe human face image is identified from the gallery database by detecting and segmenting a plurality of partial face components from the probe human face image; creating a probe template for each of the partial face components from the probe human face image, comparing each of the probe templates against a category of templates in the gallery database to generate similarity scores between the probe templates and templates in the gallery database; generating a plurality of sub-lists of candidate images having partial face component templates with the highest similarity scores over a first preset threshold; generating for each candidate image from each sub-list a combined similarity score; and generating a final list of candidates from said candidates of combined similarity scores over a second preset threshold.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

DESCRIPTION OF THE PREFERRED EMBODIMENT

To simplify the description and clear any possible terminology confusion, we make a few definitions herein. "Gallery" is associated with the biometric data stored in the database normally with "known" identity, whereas "probe" is associated with incoming-quested biometric data (normally with "unknown" identity) that will be matched against the "gallery" in a database to find or identify any possible similarities or verify similarities of incoming-quested biometric data as matching result. A "probe", or "probing", or a "probe process" is herein referred to a process to find or identify one or more top candidates on their similarity to a given "probe" biometric data (may include partial face components) of one kind of biometric data type, or referred to a process to verify the similarity among two or more biometric data of same kind of biometric data type. A "template" is a feature vector, or a collection of characteristic features extracted by an algorithm for targeted biometric data, in which "an algorithm" or "algorithm" herein is referred to an algorithm used often for image pattern processing for pattern recognition (such as face recognition), as an example of such an algorithm is "Principal Component Analysis (PCA)", there are a lot of other algorithms can be, or have been or will be applied to the face recognition; an "algorithm" herein may also refers to the whole procedure of generating a template from a biometric data. For those skilled in the art, it is understandable that template-based face recognition is only one of many possible methods for face recognition and also for partial face recognition presented herein; other methods will become apparent the present invention pertains without departing from its spirit and scope.

Figure 7:
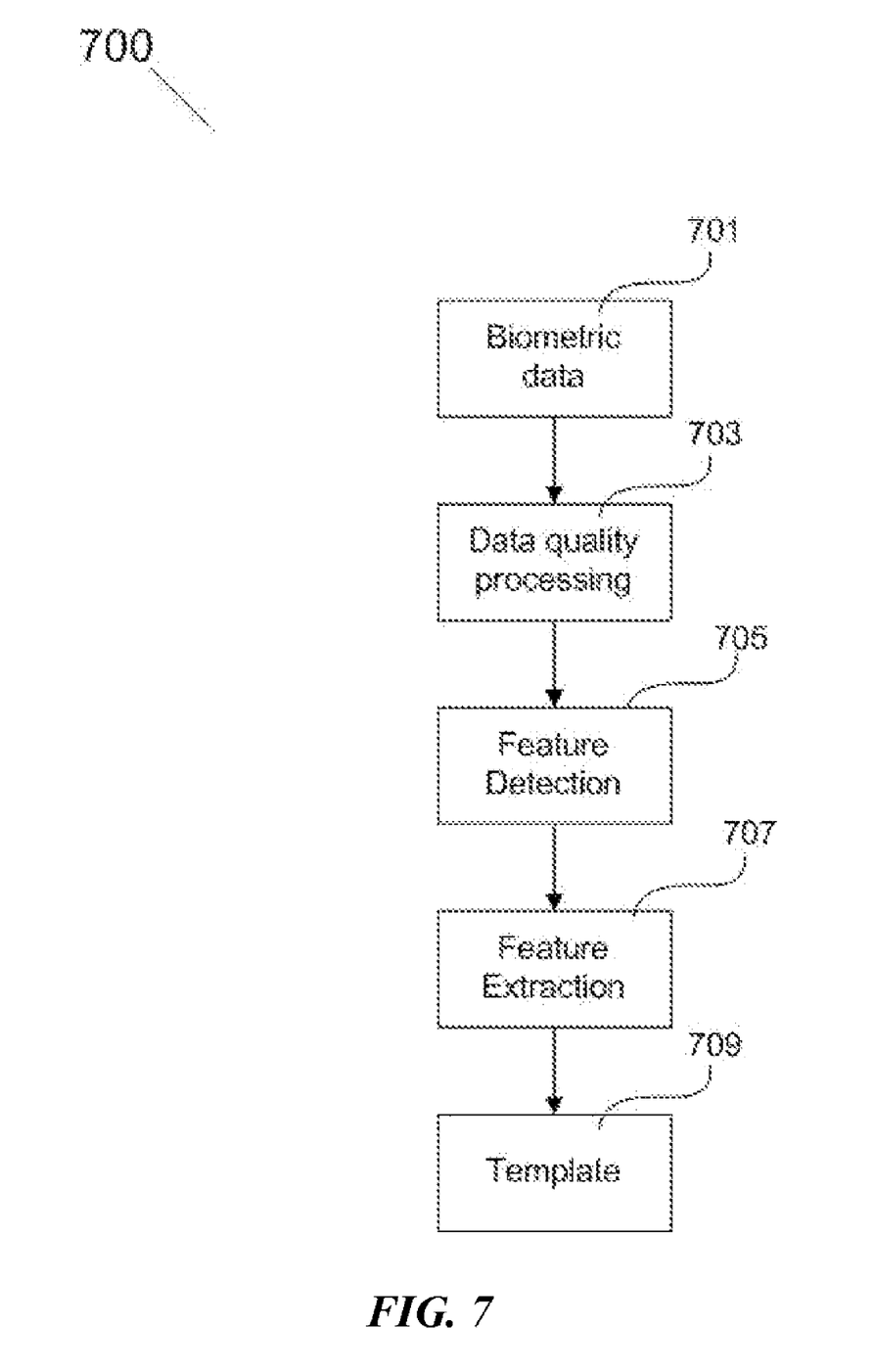
FIG. 7 illustrates a general processing procedure to generate a template from a biometric data such as a human face, or a left eye of a human face, or a right eye of a human face, etc. in accordance with a preferred embodiment of the present invention.

A conceptual block diagram in FIG. 7 illustrates a general processing procedure to generate a template from a biometric data such as a human face, or a left eye of a human face, or a right eye of a human face, etc. An image of human face is given as a biometric data 701; it is normally and optionally processed 703 to improve the overall image quality, which may include lighting normalization, shadow removal, histogram normalization, etc. In case of whole face recognition as most academic and vendors do, step 705 "Feature Detection" will try to find and segment one or multiple whole human face(s) from the image 701 and may also locate all major feature points for each human face. Then an algorithm will normally be applied 707 to process and extract a feature vector or a collection of features for each whole face, which is a template 709 of the given face; multiple faces of a single image may generate multiple templates.

Figure 1:
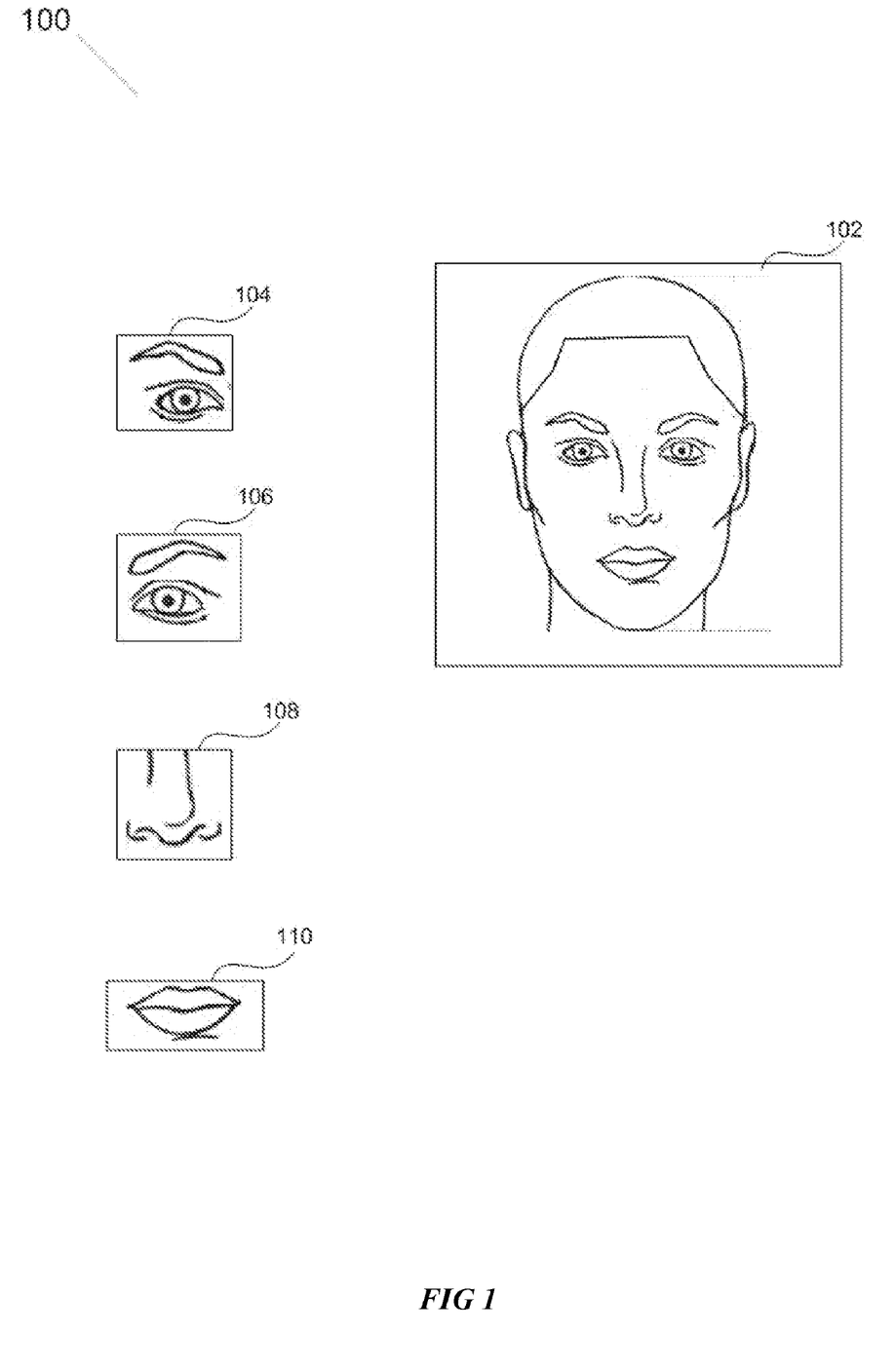
FIG. 1 illustrates a conceptual diagram of a human face and some of its partial components, left eye, right eye, nose, mouth in accordance with a preferred embodiment of the present invention.

For an exemplary embodiment of the present invention, at step 705, instead of treating a whole face to be segmented and processed to generate a template, partial components such as left eye 104, right eye 106, nose 108, mouth 110, right ear (not shown), left ear (not shown) will be segmented from a whole human face 102, as illustrated in FIG. 1, then each segmented image with one partial component will be analyzed by an algorithm to extract features to generate a template for each separated partial component. The processing between the partial component face and a whole face from a segmented image to a template is almost the same; the same technique used for a whole face may be similarly applied to each partial face component.

Figure 4:
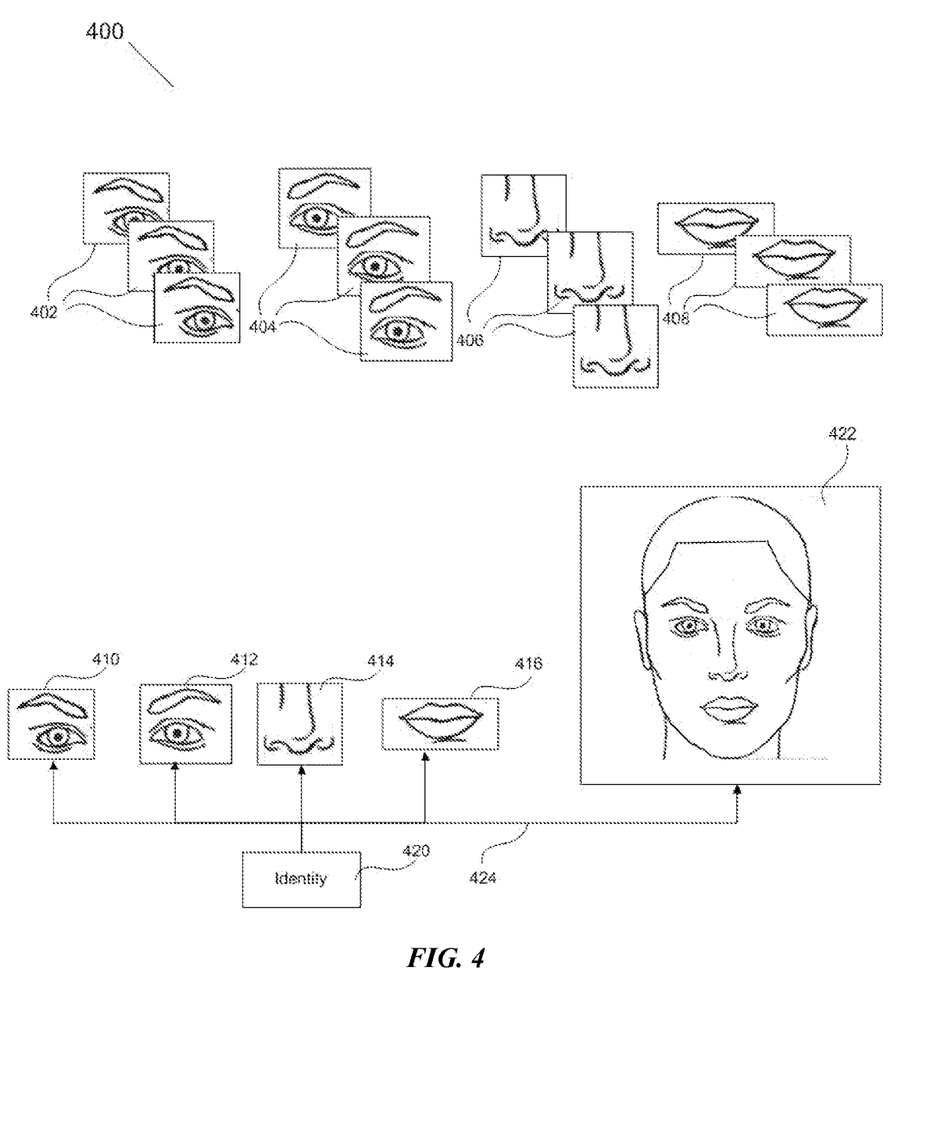
FIG. 4 illustrates a conceptual diagram of categorizing and grouping partial components in gallery database for recognition in accordance with a preferred embodiment of the present invention.

Referring to FIG. 4, for a frontal whole face 422, at least four partial components can be segmented to generate a template for each of them, left eye 410, right eye 412, nose 414, mouth 416; partial components from the same individual are linked 424 to a single identity 420 in the gallery database.

Still referring to FIG. 4, in a gallery database, different partial components from different individuals are grouped into different categories in gallery database, such as left eyes from one or multiple individuals are grouped in one category 402, right eyes from one or multiple individuals are grouped in one category 404, noses from one or multiple individuals are grouped in one category 406, mouths from one or multiple individuals are grouped in one category 408, etc. Further indexation based on metadata depicted in Patent Application "Enhanced Biometric Platform and Implementation thereof", filed on Aug. 9, 2005 by Tianlong Chen et al. can be similarly applied to the partial component face recognition also.

Figure 2:
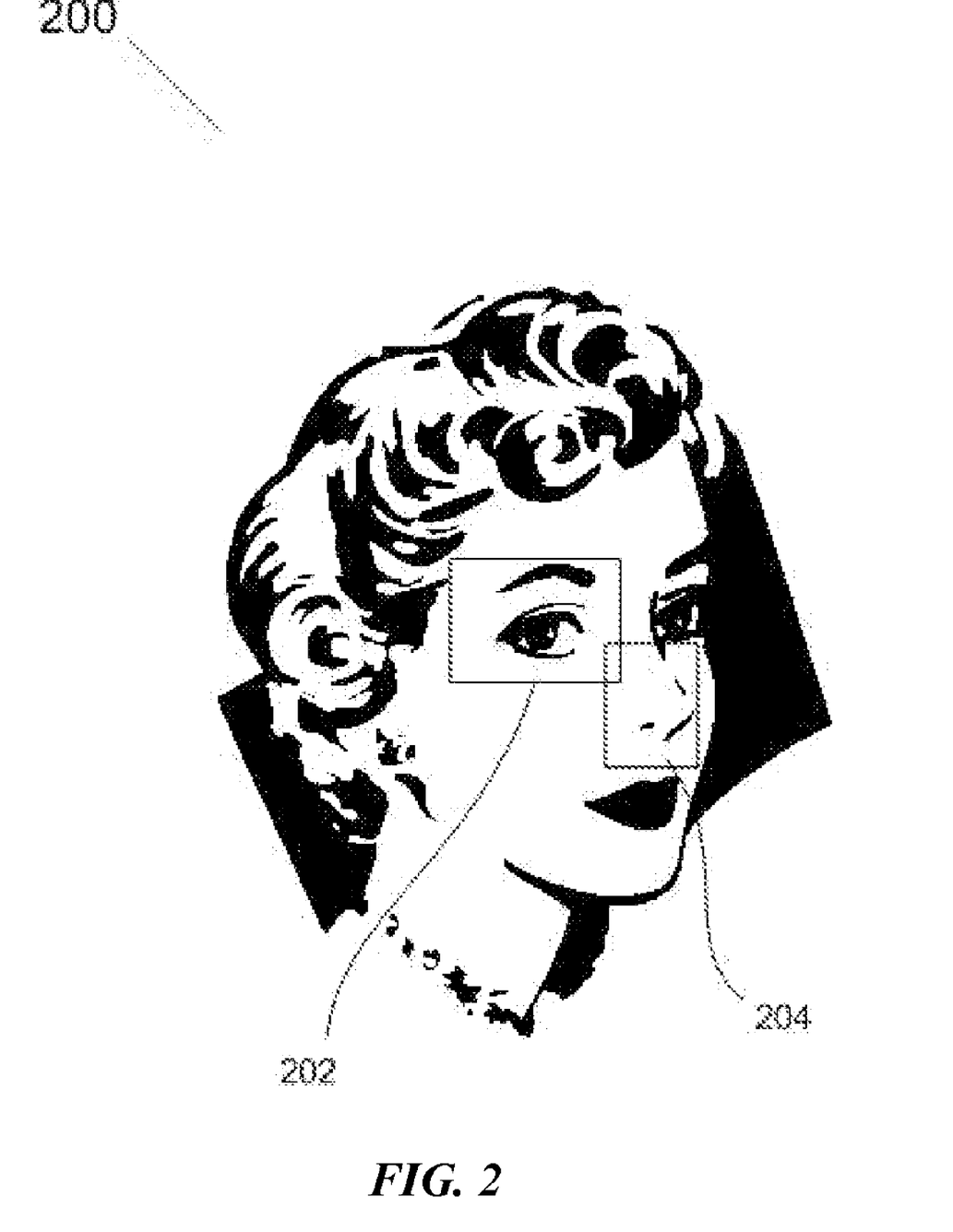
FIG. 2 illustrates a conceptual diagram of a human face of large off-angle pose where one side of face is more recognizable than the other.

FIG. 2 illustrates an image in which a human face with large rotation angle such that the right eye partially blocked by nose, only left eye 202 and nose 204 seem more recognizable. As an exemplary embodiment of the present invention, the image is segmented into two portions, one of left eye 202, the other of nose 204, a template is generated respectively from segmented left eye 202 and nose 204; then the template for left eye is used to search from the left eye group in gallery database aforementioned to find a list of candidates that have high similarity scores than a pre-set threshold, do the same for nose; then combine the two candidate lists, and either present the two candidate lists as final result, or present a combined candidate list as a final result based on combined similarity scores from the two candidate lists; a combination method may look like this: the candidate with the addition of two similarity scores of a candidate may be selected into final candidate list if the addition is over a preset threshold, other combination method may be applicable here by user configuration; the final candidate list includes identities for each candidate.

Figure 3:
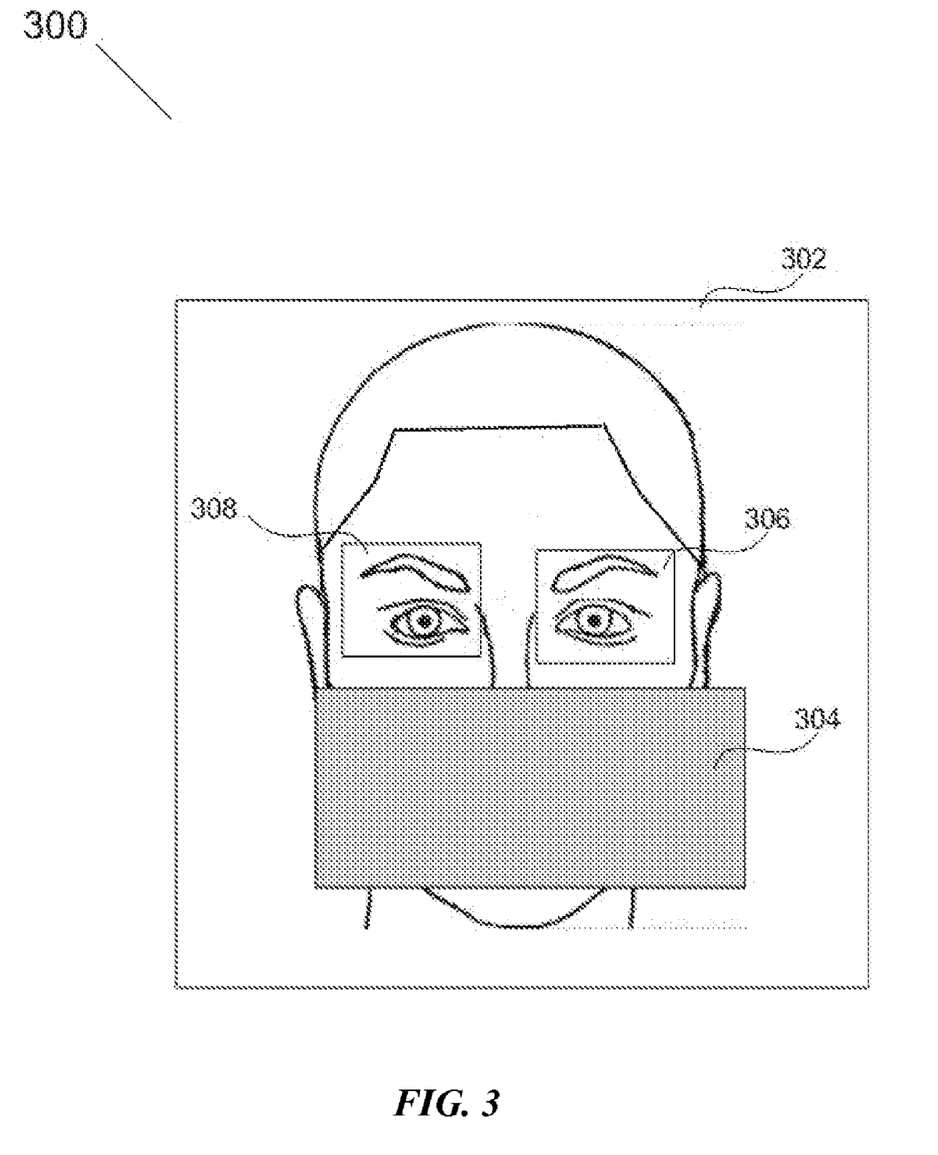
FIG. 3 illustrates a conceptual diagram of a human face blocked by an obstacle such that only two eyes can be possibly be used for recognition.

FIG. 3 illustrates an image in which a human face 302 is blocked 304, only left eye 308 and right eye 306 are recognizable; the image is segmented to extract left eye 308 and right eye 306 respectively; from the two segmented images, a template is generated for right eye 306 and left eye 308 respectively; then the template for left eye 308 is used to search from the left eye group in gallery database a aforementioned to find a list of candidates that have high similarity scores than a pre-set threshold, do the same for right eye 306; combine the two candidate lists, and either present the two candidate lists as final result, or present a combined candidate list as a final result based on combined similarity scores from the two candidate lists; a combination method may look like this: the candidate with the addition of two similarity scores of a candidates may be selected into final candidate list if the addition is over another preset threshold, other combination method may be applicable here; the final candidate list includes identities for each candidate.

Figure 5:
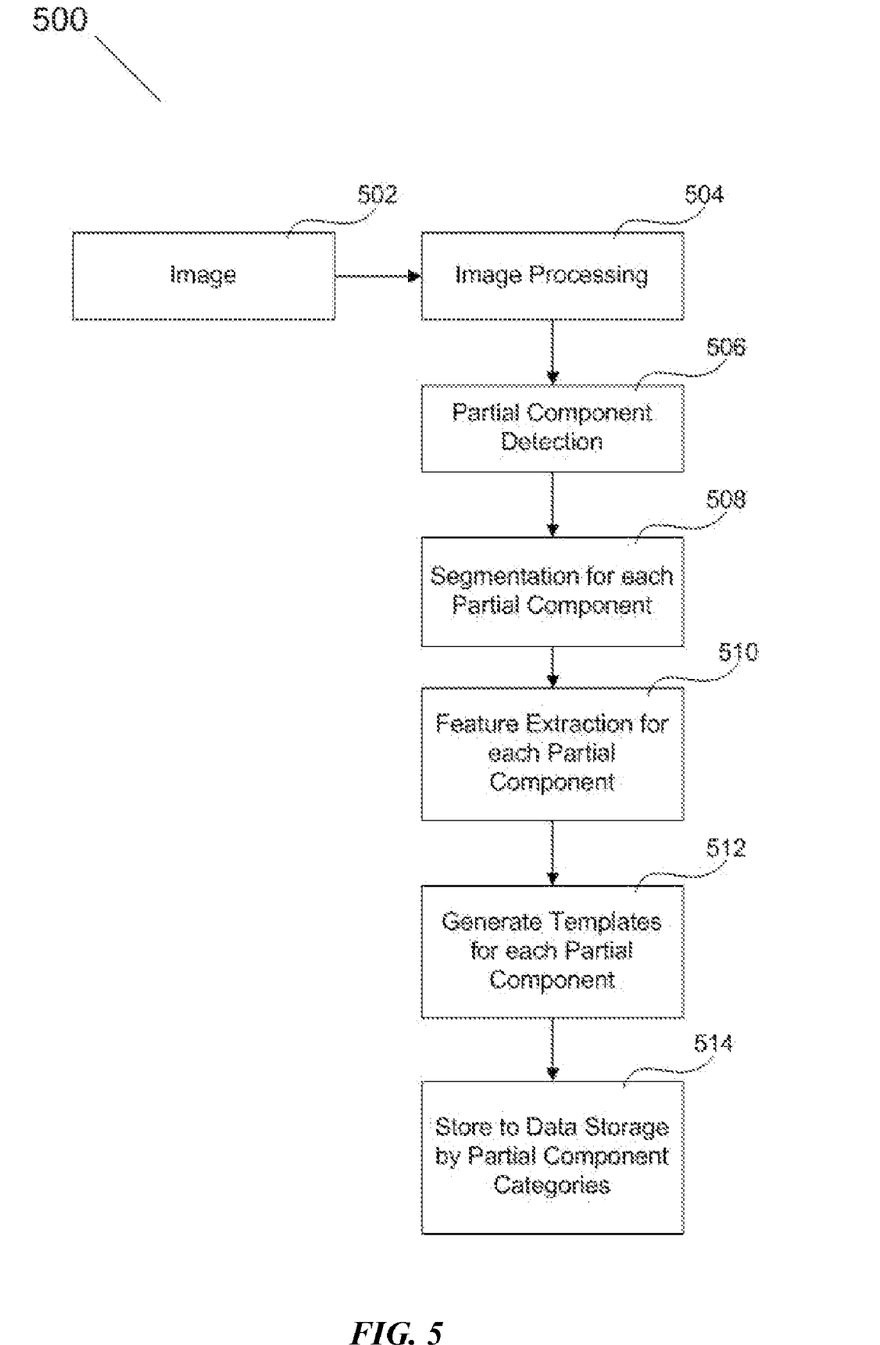
FIG. 5 illustrates a conceptual procedure diagram of preparing a partial components gallery database in accordance with a preferred embodiment of the present invention.

FIG. 5 illustrates a conceptual procedure diagram 500 of preparing a gallery database for partial component face recognition as an exemplary embodiment of the present invention. An image 502 is first processed by "image processing" 504 for the purpose of improving image quality for face recognition, then the image is processed 506 to detect human face and face components; if no face is ever detected whether it is partial or whole, the preparation process 500 is skipped to the next image, or stopped; ideally an image 502 for preparing a gallery database has a whole face in good quality (as minimum, "good quality" indicates a face or face component is recognizable by algorithm in rather reliable confidence, and can generate a template), or its quality may be extracted as metadata for better matching (see Patent Application "Enhanced Biometric Platform and Implementation thereof" by Tianlong Chen et al.); detected components (e.g. left eye, right eye, nose, mouth, left ear, right ear) are segmented 508; each of segmented components are then processed by an algorithm to generate a template 512; store templates 514 and group them into different categories into gallery data storage such that left eyes are in left eye category, right eyes are in right eye category, etc.

Figure 6:
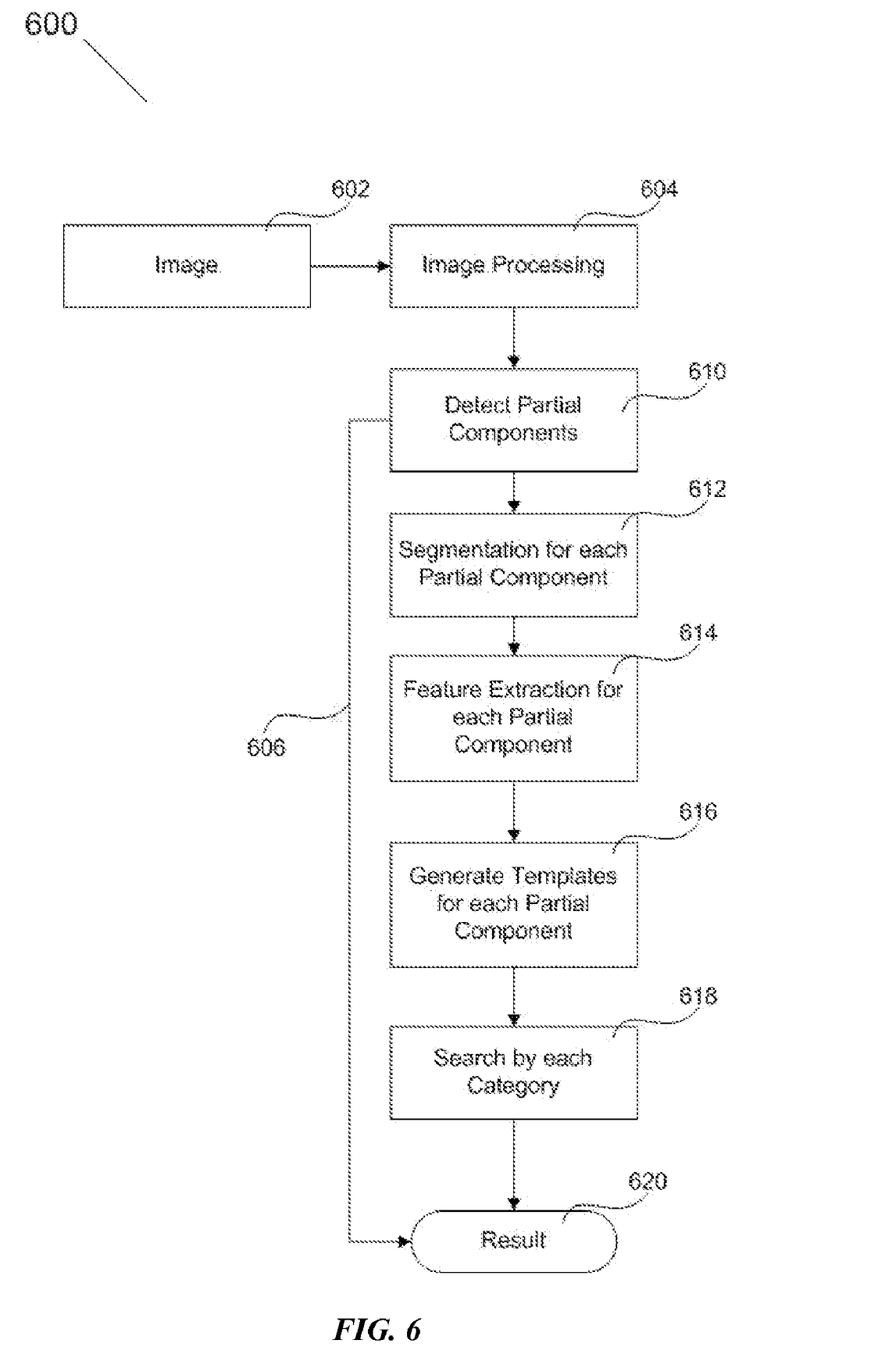
FIG. 6 illustrates a conceptual procedure diagram of searching partial components for identification and verification in accordance with a preferred embodiment of the present invention.

FIG. 6 illustrates a conceptual procedure diagram 600 of partial component identification or verification as an exemplary embodiment of the present invention. In case of identification, at least one image 602 is given to the system to find candidates with high similarity scores, the image 602 is processed 604 for image quality improvement, it is then processed to 610 detect face and face components if any; if no human face is found, "no face found" 606 is returned as result 620; if a human face is found, partial components of a human face that in good condition ("good condition" may be user-configurable) are segmented 612; and for each available components, algorithm is applied to 614 extract features, and then generate a template 616 for each partial component; each available component (i.e. the component is in "good condition") is used to 618 search its related categories for a list of candidates, then the candidate lists from all available candidates are combined to generate a result 620. In case of verification, at least two images 602 are given to the system to find similarity of partial or whole faces, process images 602 through same steps 610, 612, 614, 616 as for the case of identification as aforementioned; then compare 619 the templates of commonly available same kind of components to generate a similarity score for each kind of components (i.e. left eye, right eye, etc.), combine the similarity scores from commonly available component matching scores to generate a final result 620 for similarity of two human faces in two images if any; if no human face is found on one of images, "no face found" on that image will be reported in result 620.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for face identification of a probe human face image from a plurality of human face images in a gallery database having a plurality of templates, each template corresponding to a partial face component and said templates in said gallery database being grouped into categories, comprising the steps of:

detecting and segmenting a plurality of partial face components from said probe human face image;

creating a probe template for each of said partial face components from said probe human face image;

comparing a first probe template against a first category of templates in said gallery database and a second probe template against a second category of templates in said gallery database to generate similarity scores between said first and second probe templates and said first and second templates in said gallery database;

generating a first list of candidate images whose first template in said gallery database has a similarity score with said first probe template over a preset threshold and a second list of candidate images whose second template in said gallery database have a similarity score with said second template over said preset threshold.

2. A method for face recognition according to claim 1 further comprising the steps of:

generating a combined similarity score for each candidate image on said first and second lists;

comparing each combined similarity score with a second threshold; and generating a final list of candidate images having the highest combined similarity scores over said second threshold.

3. A method for face identification of a probe human face image from a plurality of human face images in a gallery database having a plurality of templates, each template corresponding to a partial face component and said templates in said gallery database being grouped into categories, comprising the steps of:

detecting and segmenting a plurality of partial face components from said probe human face image;

creating a probe template for each of said partial face components from said probe human face image;

comparing each of said probe templates against a category of templates in said gallery database to generate similarity scores between said probe templates and templates in said gallery database;

generating a plurality of sub-lists of candidate images having partial face component templates with the highest similarity scores over a first preset threshold;

generating for each candidate image from each said sub-list a combined similarity score; and generating a final list of candidates having combined similarity scores over a second preset threshold.

* * * * *